US009202379B2

(12) United States Patent
Yamashiro

(10) Patent No.: US 9,202,379 B2
(45) Date of Patent: Dec. 1, 2015

(54) CONVOY TRAVEL APPARATUS

(71) Applicant: DENSO CORPORATION, Kariya, Aichi-pref (JP)

(72) Inventor: Takahisa Yamashiro, Chiryu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/041,463

(22) Filed: Sep. 30, 2013

(65) Prior Publication Data

US 2014/0100734 A1 Apr. 10, 2014

(30) Foreign Application Priority Data

Oct. 4, 2012 (JP) ................................ 2012-222444

(51) Int. Cl.

| | |
|---|---|
| ***G06F 7/00*** | (2006.01) |
| ***G08G 1/00*** | (2006.01) |
| *G05D 1/00* | (2006.01) |
| *G06F 19/00* | (2011.01) |
| *G01C 21/00* | (2006.01) |

(52) U.S. Cl.
CPC ...................................... *G08G 1/22* (2013.01)

(58) Field of Classification Search
None
See application file for complete search history.

(56) References Cited

U.S. PATENT DOCUMENTS

| | | | | |
|---|---|---|---|---|
| 5,777,451 | A * | 7/1998 | Kobayashi et al. | 318/587 |
| 5,942,993 | A * | 8/1999 | Mio et al. | 340/933 |
| 6,032,097 | A * | 2/2000 | Iihoshi et al. | 701/96 |
| 6,167,331 | A * | 12/2000 | Matsumoto et al. | 701/23 |
| 6,356,820 | B1 * | 3/2002 | Hashimoto et al. | 701/23 |
| 7,474,231 | B2 | 1/2009 | Sohr | |
| 8,489,305 | B2 * | 7/2013 | Arai et al. | 701/96 |
| 8,649,962 | B2 * | 2/2014 | Davis et al. | 701/117 |
| 8,660,779 | B2 * | 2/2014 | Shida | 701/117 |
| 8,700,297 | B2 * | 4/2014 | Matsumura et al. | 701/117 |
| 8,738,275 | B2 * | 5/2014 | Shida | 701/117 |
| 8,781,707 | B2 * | 7/2014 | Kagawa et al. | 701/96 |
| 2006/0155427 | A1 * | 7/2006 | Yang | 701/1 |
| 2006/0195250 | A1 * | 8/2006 | Kawaguchi | 701/117 |
| 2010/0134320 | A1 * | 6/2010 | Chevion et al. | 340/932 |
| 2010/0256852 | A1 * | 10/2010 | Mudalige | 701/24 |

(Continued)

FOREIGN PATENT DOCUMENTS

| | | |
|---|---|---|
| JP | H10-261194 | 9/1998 |
| JP | 11-328584 | 11/1999 |

(Continued)

OTHER PUBLICATIONS

Machine translation of JP 2009-003554.*

(Continued)

*Primary Examiner* — John R Olszewski
*Assistant Examiner* — Navid Ziaeianmehdizadeh
(74) *Attorney, Agent, or Firm* — Harness, Dickey & Pierce, P.L.C.

(57) ABSTRACT

A convoy travel apparatus in a self vehicle of a convoy organizes plural convoys of traveling vehicles in consideration of a non-convoy vehicle that desires to pass the plural convoys when the plural convoys are traveling in parallel on a multi-lane road. The apparatus determines whether the plural convoys are traveling in parallel with each other on a multi-lane road, and if an in-parallel travel state of the convoys is determined, the self vehicle in one of the convoys may be accelerated or decelerated to allow the non-convoy vehicle to pass the plural convoys.

10 Claims, 6 Drawing Sheets

(56) References Cited

U.S. PATENT DOCUMENTS

| | | | | |
|---|---|---|---|---|
| 2011/0093177 | A1* | 4/2011 | Horn | 701/70 |
| 2011/0106391 | A1* | 5/2011 | Shida | 701/96 |
| 2011/0248868 | A1* | 10/2011 | Free | 340/907 |
| 2011/0270513 | A1* | 11/2011 | Shida | 701/117 |
| 2012/0072089 | A1* | 3/2012 | Nemoto et al. | 701/96 |
| 2012/0123658 | A1* | 5/2012 | Kagawa | 701/93 |
| 2013/0079953 | A1* | 3/2013 | Kumabe | 701/2 |
| 2013/0080040 | A1* | 3/2013 | Kumabe | 701/117 |
| 2013/0080041 | A1* | 3/2013 | Kumabe | 701/117 |
| 2013/0211624 | A1* | 8/2013 | Lind et al. | 701/2 |

FOREIGN PATENT DOCUMENTS

| | | |
|---|---|---|
| JP | H11-328597 | 11/1999 |
| JP | 2007-058631 | 3/2007 |
| JP | 2009-003554 | * 1/2009 |
| JP | 2013-061788 | 4/2013 |

OTHER PUBLICATIONS

Office Action issued Jul. 22, 2014 in corresponding JP Application No. 2012-222444 (with English translation).

* cited by examiner

CONVOY TRAVEL APPARATUS

CROSS-REFERENCE TO RELATED APPLICATION

The present application is based on and claims the benefit of priority of Japanese Patent Application No. 2012-222444 filed on Oct. 4, 2012, the disclosure of which is incorporated herein by reference.

TECHNICAL FIELD

The present disclosure generally relates to an in-vehicle convoy travel apparatus for performing a vehicle travel control to organize a convoy travel of vehicles.

BACKGROUND

Generally, a convoy travel of vehicles is controlled by a technique disclosed in, for example, a patent document 1 (i.e., Japanese Patent Laid-Open No. H11-328584), in which a plurality of vehicles form a convoy of vehicles in a single lane of a road. The convoy of vehicles is controlled by a vehicle travel control which is communicated from vehicles in a front part of the convoy to vehicles in a rear part of the convoy. Such a technique contributes to a reduction of the inter-vehicle distance in the convoy, and as a result, alleviates congestion on the road, for example.

However, when two or more convoys travel in parallel on a multi-lane road, such a technique is unaware of non-convoy vehicles that wish to overtake and pass the two or more convoys. That is, when two or more convoys and an overtaking vehicle(s) are traveling in the same traffic direction on a multi-lane road that has multiple lanes on each side of traffic, according to the convoy travel technique in patent document 1, the non-convoy vehicle may be unable to overtake the two or more convoys traveling in parallel.

More practically, when all lanes of a multi-lane road are obstructed by in-parallel traveling convoys, an overtaking vehicle(s) may be unable to pass such convoys. Similarly, when two lanes of a three-lane road are occupied by in-parallel traveling convoys, the overtaking vehicle may be required to change multiple lanes in order to pass both in-parallel traveling convoys.

SUMMARY

It is an object of the present disclosure to provide a convoy travel apparatus that organizes a convoy of traveling vehicles in consideration of an overtaking vehicle that desires to pass the convoy when plural convoys are organized on a multi-lane road.

In an aspect of the present disclosure, the convoy travel apparatus for use in a self vehicle has a follow travel control unit for guiding the self vehicle to follow a preceding vehicle based on information transmitted from the preceding vehicle through communication, with the preceding vehicle and at least one follower vehicle making up a convoy of traveling vehicles. The apparatus includes an in-convoy vehicle identification unit for identifying each of all vehicles except the self vehicle in a self convoy as an in-convoy vehicle. The apparatus also includes an order identification unit for determining an order of the self vehicle in the self convoy based on the information obtained from other vehicles and a distance calculator for calculating a leader vehicle distance, based on the information from the other vehicles, between the self vehicle and a leader vehicle of the self convoy and a tail vehicle distance between the self vehicle and a tail vehicle traveling at a tail end of the self convoy. Additionally, the apparatus includes a convoy information transmitter for transmitting, to the other vehicles, convoy information including the leader vehicle distance, the tail vehicle distance, a current position of the self vehicle, and a travel direction of the self vehicle. Further, the apparatus includes a parallel travel determination unit for determining, when the self vehicle is the leader vehicle of the self convoy, whether the self convoy and an object convoy are traveling in parallel with each other in an in-parallel travel state, based on the convoy information of the self convoy that at least includes the tail vehicle distance, the current position of the self vehicle, and the travel direction of the self vehicle and the convoy information of the object convoy transmitted from an external vehicle that does not belong to the self convoy, the convoy information of the object convoy including a current position, a travel direction, a leader vehicle distance and a tail vehicle distance of the external vehicle. In addition, the apparatus includes a parallel travel resolver for resolving the in-parallel travel state of the self convoy and the object convoy by controlling a behavior of the self vehicle when the parallel travel determination unit determines that the two convoys are in the in-parallel travel state.

When the self vehicle is the leader vehicle of the self convoy, the position of the self convoy (i.e., the positions of the leader vehicle and the tail vehicle in the self convoy) can be estimated based on the position, the travel direction, and the tail distance of the self vehicle. Further, based on the convoy information of the other vehicle that is in the object convoy, the position of the object convoy (i.e., the positions of the leader vehicle and the tail vehicle in the object convoy) can be estimated. Then, in case that two convoy positions can be estimated, whether or not the self convoy and the object convoy are traveling in parallel can be determined. That is, in other words, the parallel travel determination unit can determine an in-parallel travel state of the two convoys on a multi-lane road, in which the self convoy and the object convoy are traveling in parallel with each other.

Further, when the self vehicle is a leader vehicle in the self convoy, by controlling the vehicle behavior of the self vehicle, other following in-convoy vehicles in the self convoy are automatically controlled to follow the leader vehicle, because all in-convoy vehicles are set to follow the leader vehicle. Therefore, when the self convoy and the object convoy are determined to be traveling in parallel, the behavior control of the self vehicle which leads the self convoy by the parallel travel resolver for resolving the in-parallel travel state eventually leads to a resolution of the in-parallel travel state of the self and object convoys.

Since the convoy travel apparatus of the present disclosure can resolve the in-parallel travel state of the self convoy and the object convoy when the parallel travel determination unit determines the in-parallel travel state of the two convoys, the convoy travel apparatus can allow an overtaking vehicle behind the two convoys to pass the two convoys when the two convoys traveling in parallel hinder such passing of an overtaking vehicle that is not a vehicle within either of the two convoys.

BRIEF DESCRIPTION OF THE DRAWINGS

Other objects, features and advantages of the present disclosure will become more apparent from the following detailed description disposed with reference to the accompanying drawings, in which.

DETAILED DESCRIPTION

Embodiments of the present disclosure are described in the following with reference to drawings.

First Embodiment

Figure 1:
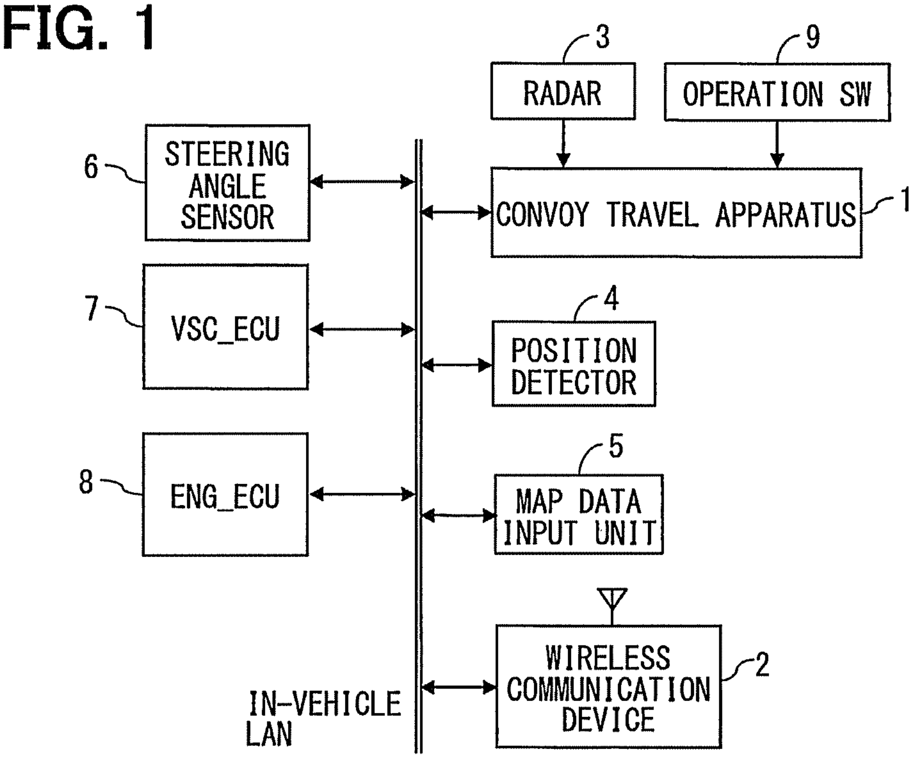
FIG. 1 is a block diagram illustrating a configuration of a convoy travel apparatus in a first embodiment of the present disclosure.

A convoy travel apparatus 1 is connected to the following components, for the exchange of electronic information. That is, the apparatus 1 exchanges information with a wireless communication device 2, a radar 3, a position detector 4, a map data input unit 5, a steering angle sensor 6, a VSC_ECU 7, an ENG_ECU 8, and an operation switch 9, as shown in FIG. 1. More practically, the convoy travel apparatus 1 may be connected to the wireless communication device 2, the position detector 4, the map data input unit 5, the steering angle sensor 6, the VSC_ECU 7, and the ENG_ECU 8 through an in-vehicle LAN that has a standardized protocol such as CAN (i.e., Controller Area Network) or the like.

The wireless communication device 2 is a well-known vehicle-to-vehicle communication unit that performs a short distance wireless communication in a frequency band of 700 MHz, 5.8 GHz or the like. More practically, the wireless communication device 2 performs, for example, a broadcast communication with other vehicles, in which a destination of the communication (e.g., a destination vehicle of the vehicle-to-vehicle communication) is not specified/identified.

The radar 3 emits an electromagnetic wave toward a front field of the self vehicle, and detects a reflection wave from the front field, for scanning a predetermined range around the self vehicle. The emission control for emitting the electromagnetic wave is performed by the convoy travel apparatus 1, and a detection signal that indicates that a reflection wave is detected is supplied for the convoy travel apparatus 1. For example, the radar 3 may be a millimeter wave radar, a laser radar or the like. The radar 3 can thus detect a distance to an object vehicle in the front field of the self vehicle, (i.e., in the predetermined range from the self vehicle), as well as a relative speed of the object vehicle relative to the self vehicle.

The position detector 4 is capable of detecting and determining a current position of the self vehicle on demand or at predetermined intervals, based on information from various sensors, which may be, for example, a geomagnetism sensor detecting geomagnetism, a gyroscope detecting an angular speed around a vertical axis of the self vehicle, a range sensor detecting a travel distance of the self vehicle, and a GPS, i.e., a Global Positioning System, detecting a current position of the self vehicle by using a signal from GPS satellites.

Further, the position detector 4 detects, on demand or at predetermined intervals, a travel direction of the self vehicle by using the geomagnetism sensor and/or the gyroscope. The travel direction of the self vehicle may be determined based on a straight line that connects several latest current positions of the self vehicle, which is calculated by a least square method based on position coordinates of those current positions, assuming that such straight line represents the travel direction of the self vehicle. In the following description of the present embodiment, it is assumed that the travel direction of the self vehicle is detected and determined by the geomagnetism sensor and/or the gyroscope of the position detector 4, on demand or at predetermined interval.

Further, depending on the detection accuracy of those sensors, the position detector 4 may include some of the above sensors, or may have additional sensors in addition to the above sensors. Further, for example, the current positions of the self vehicle and other vehicle(s) are represented by using a longitude and a latitude, while the travel direction is described as a bearing angle measured relative to due north.

The map data input unit 5 is a device to input map data to a storage medium (not illustrated) in the unit 5. Link data and node data representing a road are included in the map data. The link data also includes the number of the traffic lanes and a speed limit value of the representing road.

The steering angle sensor 6 is a sensor for detecting a steering angle of the self vehicle. The VSC_ECU 7 controls a VSC function (i.e., Vehicle Stability Control, a registered trademark) for controlling a sideway slip of the vehicle by controlling a brake actuator (not illustrated) which applies a braking force to the vehicle. The VSC_ECU 7 receives information about a requested deceleration from the in-vehicle LAN, and controls the brake actuator for generating the request deceleration of the vehicle. Further, the VSC_ECU 7 transmits a vehicle speed and a brake pressure to the in-vehicle LAN.

The ENG_ECU 8 receives information about a requested acceleration from the in-vehicle LAN, and controls a throttle actuator (not illustrated) for generating the requested acceleration of the vehicle. Further, when receiving information about the requested deceleration, the ENG_ECU 8 controls the throttle actuator to generate engine braking. The operation SW 9 is a group of switches which are operable by the driver of the self vehicle, and operation information of the group of switches is output to the convoy travel apparatus 1.

The convoy travel apparatus 1 is implemented as a microcomputer, and includes a CPU, a ROM, a RAM, and an input/output connected by a bus, which are all well-known components. The convoy travel apparatus 1 performs various processes based on information of various kinds that are input from the wireless communication device 2, the radar 3, the position detector 4, the map data input unit 5, the steering angle sensor 6, the VSC_ECU 7, and the ENG_ECU 8.

The convoy travel apparatus 1 performs a vehicle information transmission process. A flow of the vehicle information transmission process is described with reference to a flowchart in FIG. 2. The vehicle information transmission process is repeatedly performed at predetermined intervals of every 100 milliseconds or the like.

First, in step S1, the process determines a current position of the self vehicle, and proceeds to step S2. The determination of the current position of the self vehicle is performed by obtaining the current position from the position detector 4. Further, for such a determination, a detection signal of the position detector 4 may be obtained, and the current position of the self vehicle may be determined by the convoy travel apparatus 1 based on such a detection signal.

In step S2, the process generates position related information, and proceeds to step S3. The position related information includes the current position that is determined in step S1. Further, the position related information includes an in-convoy order of the self vehicle, which represents the number of vehicles from a leader vehicle to the self vehicle in a self convoy, whenever such order has already been determined. The in-convoy order may refer to a leader vehicle of the convoy, or may refer to a tail-end vehicle (i.e., a tail or rear-most vehicle) in the convoy, for determining an order of the self vehicle in the convoy.

In step S3, the process generates vehicle information, and proceeds to step S4. The vehicle information includes, in addition to the position related information determined in step S2, identification information to identify the self vehicle, a vehicle speed of the self vehicle, and a travel direction of the self vehicle as well.

The vehicle speed of the self vehicle is obtained from the VSC_ECU 7, and the travel direction of the self vehicle is obtained from the position detector 4. The identification information may be, for example, a vehicle ID of the self vehicle or a device ID of the wireless communication device 2, or the like. In the present embodiment, the device ID is used as the identification information in the following description. Further, the device ID of the wireless communication device 2 is obtained from, for example, a memory of the ROM of the communication device 2.

Further, the vehicle information includes other attributes such as an inter-vehicle distance to a front vehicle that exists in front of the self vehicle (i.e., in the predetermined range of the self vehicle) detected by the radar 3 (designated as a radar inter-vehicle distance hereinafter), a travel lane of the self vehicle on the road (i.e., in which one of multiple lanes the self vehicle is currently traveling), a steering angle of the self vehicle, a signal from an accelerator switch and/or a brake switch, a connection request signal for a preceding vehicle (i.e., a signal from the self vehicle, inquiring to a vehicle in front of the self vehicle regarding whether the self vehicle may join the convoy), and a reply signal as a reply for the connection inquiry.

The travel lane of the self vehicle may be obtained in the following manner, for example. That is, when it is available, a highly accurate GPS signal may be received by the position detector 4, and the current position of the self vehicle based on the GPS positioning is obtained therefrom, which is then combined with the link data from the map data input unit 5, for accurately determining the travel lane of the self vehicle by the convoy travel apparatus 1.

Alternatively, a front camera (not illustrated) such as a fish-eye lens camera may be employed for capturing a front image of the self vehicle, including an image of the front road, and the front image is analyzed by the convoy travel apparatus 1 for determining/estimating the travel lane of the self vehicle. Further, the travel lane of the self vehicle may also be determined by the convoy travel apparatus 1 based on such an estimation by the image analysis in combination with the position information and the travel direction of the self vehicle from the position detector 4 and the link data from the map data input unit 5.

Furthermore, if the wireless communication device 2 includes a device that communicates with a roadside device such as a road beacon or the like for obtaining information through a road-to-vehicle communication, the information from such roadside device may be obtained by the communication device 2 for determining the travel lane of the self vehicle.

When the vehicle information is transmitted, the vehicle information may be configured to include time information such as a time stamp indicative of a detection time of the vehicle information. The time in the time stamp may be derived from a GPS time, which is based on an atomic clock of the satellite in the satellite positioning system.

In step S4, the process transmits (i.e., broadcasts) the vehicle information generated in step S3 from the wireless communication device 2, and the process ends.

Figure 2:
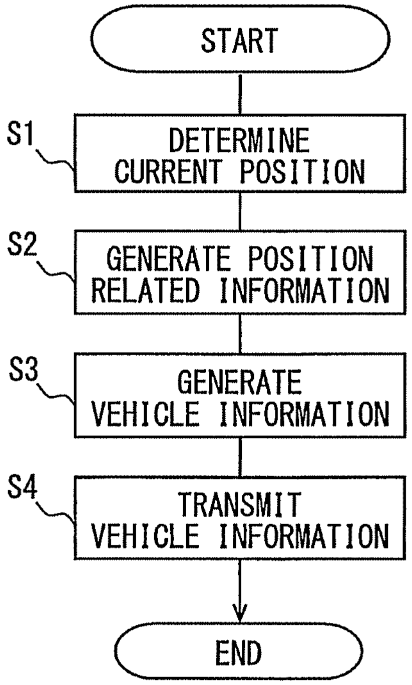
FIG. 2 is a flowchart of a vehicle information transmission process by the convoy travel apparatus.

The convoy travel apparatus 1 in the self vehicle obtains the vehicle information of the other vehicle through the wireless communication device 2 of the self vehicle by performing a process of FIG. 2, when the vehicle information of the other vehicle is generated in advance by the convoy travel apparatus 1 in the other vehicle. The convoy travel apparatus 1 stores the vehicle information from the other vehicle in a memory such as a RAM.

The convoy travel apparatus 1 erases the vehicle information that has been stored for a predetermined time or more, and overwrites the old vehicle information with the newly-obtained vehicle information having the same device ID. The newly-obtained (i.e., new) vehicle information is stored in the memory when the device ID of the new vehicle information and the device ID of the old vehicle information do not match.

The predetermined time described above means an amount of time that may be arbitrarily set, such as a few seconds or the like. In such manner, only the latest vehicle information from the vehicles around the self vehicle, which are in condition of periodically performing the vehicle-to-vehicle information, is stored in the memory.

Further, the convoy travel apparatus 1 uses various components that are connected by the in-vehicle LAN for performing a follow travel control. Therefore, the convoy travel apparatus 1 corresponds to a follow travel control unit in the claims. In the present embodiment, after turning a main switch of a cruise control switch to an ON state, which is the operation SW 9, the follow travel control may be activated by a turning ON event of a control start switch of the cruise control switch, and the follow travel control may be deactivated by a turning ON event of a control end switch of the cruise control switch.

The follow travel control starts after an identification of the closest preceding vehicle that is communicable through the vehicle-to-vehicle communication, which is used as an object of follow travel control (i.e., an object vehicle to be followed). The closest preceding vehicle may be designated as a followee vehicle. The identification of the followee vehicle is achieved by performing a followee vehicle identification process, which is described in the following.

In the followee vehicle identification process, the followee vehicle is identified based on the following comparison, that is, the comparison between (i) a preceding vehicle that is detected based on a signal from the radar 3 of the self vehicle and (ii) a sender vehicle that has transmitted the vehicle information received by the self vehicle through the vehicle-to-vehicle communication. More practically, when the preceding vehicle and the sender vehicle are similar, in terms of the speed and the distance relative to the self vehicle as well as a relative position therefrom, such preceding vehicle is determined as a followee vehicle.

An inter-vehicle distance between the self vehicle and the sender vehicle in the vehicle information, which has been transmitted by the self vehicle through the vehicle-to-vehicle communication from the sender vehicle, can be calculated based on the position coordinates of the current position regarding the self vehicle and the sender vehicle, which may be designated as an inter-position distance. More practically, an inter-position distance between the two positions of the respective vehicles is initially calculated and, by deducting an offset distance of the position detector 4 in the self vehicle from an edge of the self vehicle from the above-described inter-position distance, an inter-vehicle distance may be accurately calculated. If a position of the position detector 4 in the self vehicle is a center of the self vehicle, the inter-vehicle distance between the two vehicles (Dinter-v) is represented in the following manner.

$$\text{Dinter-}v = \text{an inter-position distance} - (\text{a vehicle length of the self vehicle} + \text{a vehicle length of the sender vehicle})/2 \quad \text{(Equation 1)}$$

The follow travel control may be implemented as a well-known vehicle control, in which the inter-vehicle distance toward the preceding vehicle is controlled to have a target distance. Further, another well-known follow travel control may additionally be performed, in which a travel locus of the preceding vehicle and a steering angle of the same are obtained through the vehicle-to-vehicle communication at predetermined intervals, and a steering wheel of the self vehicle is controlled/steered based on the obtained information.

By performing the above-described follow travel control by using the convoy travel apparatus 1 in each of the plural vehicles, each of the plural vehicles except for a "leader" of a convoy follows the preceding vehicle. As a result, a convoy travel by the plural vehicles is organized, which makes a convoy of those vehicles.

Figure 3:
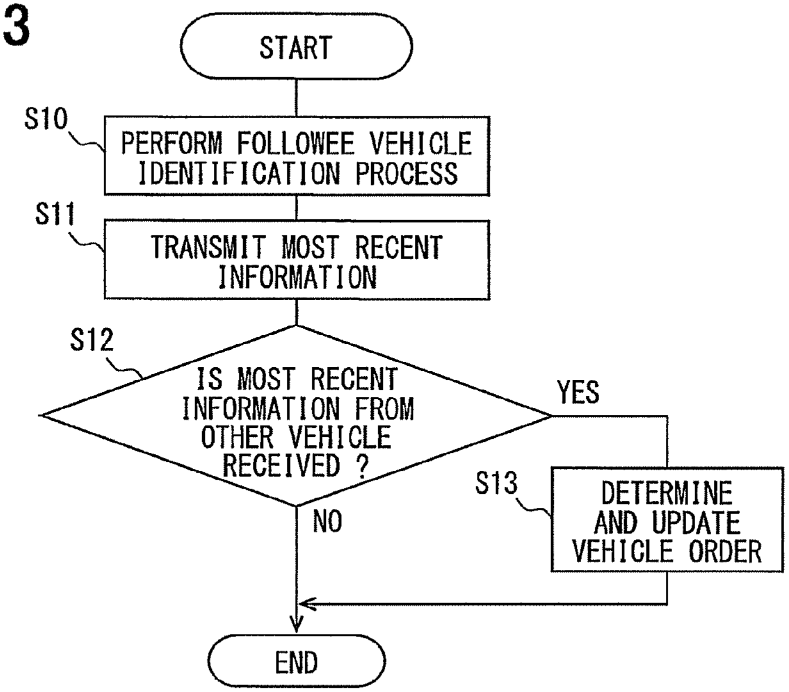
FIG. 3 is a flowchart of a vehicle order determination process by the convoy travel apparatus.

Further, the convoy travel apparatus 1 performs a vehicle order determination process. A flow of the vehicle order determination process is described with reference to a flowchart in FIG. 3. The vehicle order determination indicates an order of many vehicles, that is, which one of many vehicles is a preceding vehicle and which one of those vehicles is a succeeding vehicle, (i.e., a follower). The vehicle order determination process is repeatedly performed at predetermined intervals.

First, in step S10, the process performs the above-described followee vehicle identification process, and proceeds to step S11. In step S11, the process transmits most recent information by a broadcast method from the wireless communication device 2. The most recent information is the information including the device ID of the preceding vehicle that is identified by the followee vehicle identification process, the device ID of the self vehicle and information of an order of those vehicles. Further, the most recent information may be configured to be transmitted by the vehicle information transmission process, that is, the vehicle information transmitted by such process may include the most recent information.

In step S12, the process determines whether the most recent information from the other vehicle has been received. Then, the process proceeds to step S13, when it has determined that it received the most recent information from the other vehicle (step S12, YES). On the other hand, the process ends when it has determined that it did not receive the most recent information from the other vehicle (step S12, NO).

In step S13, the process uses the most recent information just received and the most recent information having already been received from the other vehicle(s), for the determination of the vehicle order in a currently-traveling lane of the self vehicle. Therefore, the process in step S13 corresponds to a vehicle order determination unit in the claims. The most recent information that has already been received from the other vehicle(s) is retrieved from the memory, which is stored therein as the vehicle information. When the vehicle order has already been determined, such a vehicle order is updated.

For example, when two pieces of most recent information have been received by the self vehicle, a first piece includes information of the device ID "#124" of the sender vehicle transmitting the most recent information (i.e., the first piece), and also includes information of the device ID "#31" of the preceding vehicle of the sender vehicle. The other piece (i.e., a second piece) includes information of the device ID "#91" of the sender vehicle transmitting the most recent information (i.e., the second piece), and also includes information of the device ID "#124" of the preceding vehicle of the sender vehicle.

By using the device ID "#124" that is found in both of the two pieces of information as a key, the two pieces of information can be combined. As a result, the vehicle order of "#91" to "#124" to "#31" is determined. In the above example, two pieces of information are combined. However, by combining three or more pieces of most recent information, the vehicle order of four or more vehicles can also be determined for a convoy of vehicles in a one-dimensional series of vehicle arrangement/formation.

The convoy travel apparatus 1 identifies an order of the self vehicle in a convoy of vehicles based on the determination of the vehicle order from the vehicle order determination process. Further, based on the above-described vehicle order, the other vehicles included in the self convoy are also identified.

Figure 4:
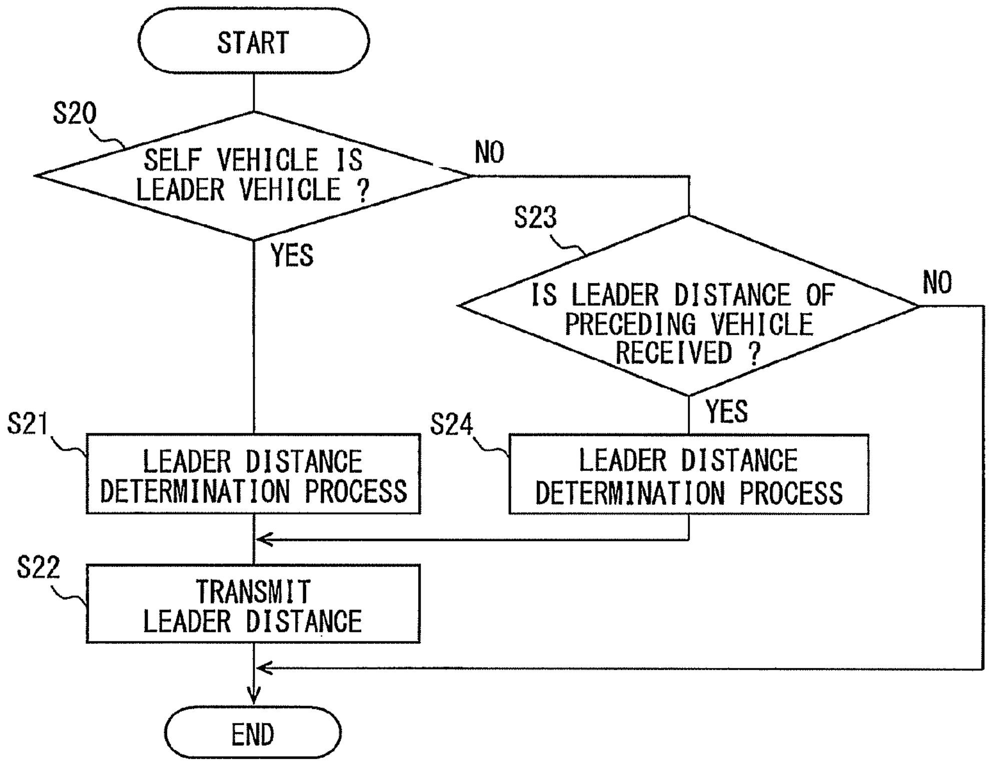
FIG. 4 is a flowchart of a leader distance determination-plus process by the convoy travel apparatus.

Further, the convoy travel apparatus 1 performs a leader distance determination-plus process. A flow of the leader distance determination-plus process is described with reference to an example of a flowchart in FIG. 4. The leader distance determination-plus process is also repeatedly performed at predetermined intervals.

First, in step S20, the process determines whether the self vehicle is a leader of the self convoy, that is, whether the self vehicle has a first order in the convoy. If the self vehicle is a leader vehicle of the convoy (step S20, YES), the process proceeds to step S21. On the other hand, the process proceeds to step S23 when the self vehicle is not a leader vehicle (step S20, NO).

In step S21, the process performs a leader distance determination process for determining a leader distance between the self vehicle and the leader vehicle in the self convoy, and proceeds to step S22. In this case, since step S21 is under a YES branch of step S20 (i.e., when the self vehicle is a leader), the leader distance is equal to "0".

In step S22, the process broadcasts the leader distance from the leader distance determination process by a broadcast method, and finishes the flow. When the leader distance is determined as "0", the process transmits the leader distance "0" in the leader distance determination process of step S21. Further, when the leader distance other than "0" is determined by the leader distance determination process of step S24 to be mentioned later, the process in step S22 transmits a leader distance other than "0". The leader distance is transmitted as a part of the vehicle information that is transmitted by the vehicle information transmission process.

In step S23, which under a NO branch of step S20, (i.e., when the self vehicle is not a leader of the self convoy), the process determines whether the self vehicle has received the leader distance of a preceding vehicle. For example, when (i) the device ID of the sender vehicle of the received vehicle information is identical with the device ID of the preceding vehicle of the self vehicle which is determined by the above-described vehicle order determination process and (ii) such vehicle information includes the leader distance, it is determined that the leader distance of the preceding vehicle has been received. The vehicle information may be retrieved from the memory described above, for use in such process in step S23.

Then, the process proceeds to step S24 when it is determined that the leader distance of the preceding vehicle has been received (step S23, YES). On the other hand, the process finishes when it is determined that the leader distance of the preceding vehicle has not been received (step S23, NO).

In step S24, the process performs the leader distance determination process for determining the leader distance between the self vehicle and the leader vehicle in the self convoy, and proceeds to step S22. In the leader distance determination process in step S24, the process determines the leader distance of the self vehicle as a sum of (i) the leader distance of the preceding vehicle of the self vehicle, (ii) a radar inter-vehicle distance of the self vehicle toward the preceding vehicle which is detected by using a signal from the radar 3, and (iii) a vehicle length of the self vehicle. For example, when the self vehicle is the second vehicle from the top of the convoy, and the radar inter-vehicle distance toward the preceding vehicle is designated as "d1", and the vehicle length is 11, the leader distance is determined as 0+d1+11. Therefore, the leader distance corresponds to a leader vehicle distance in the claims, and step S24 corresponds to a distance determination unit in the claims.

Figure 5:
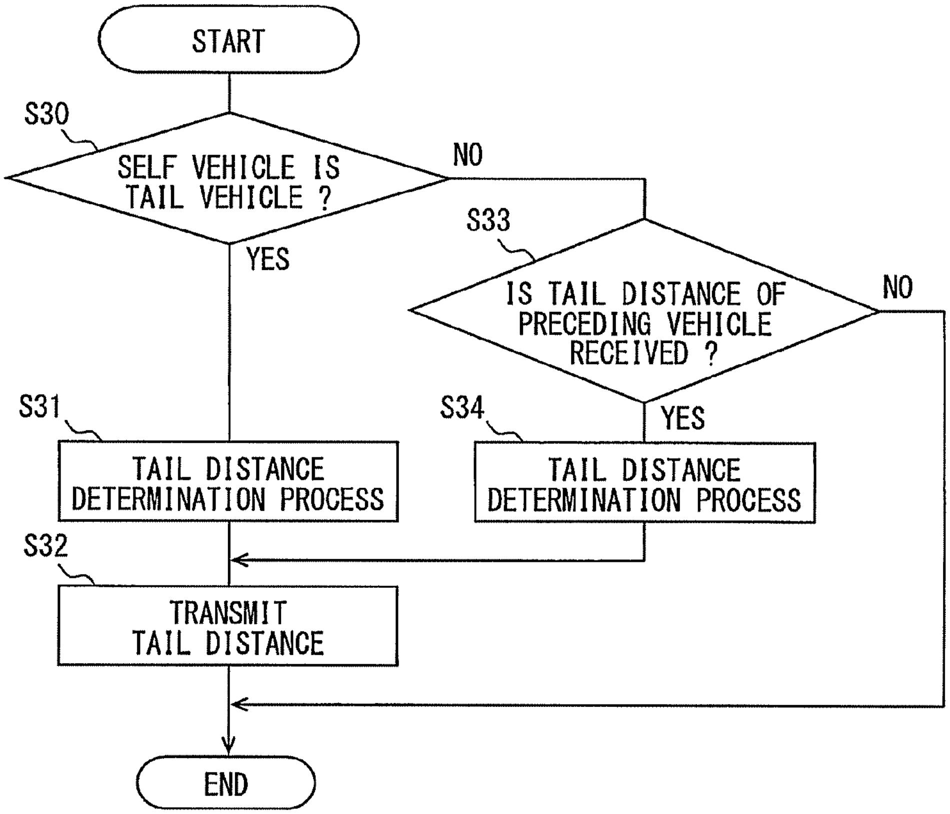
FIG. 5 is a flowchart of a tail distance determination-plus process by the convoy travel apparatus.

Further, the convoy travel apparatus 1 performs a tail distance determination-plus process. An example of a flow of the tail distance determination-plus process is described with reference to a flowchart in FIG. 5. The tail distance determination-plus process is also repeatedly performed at predetermined intervals.

First, in step S30, the process determines an order of the self vehicle in the self convoy, and, when the order of the self vehicle from a tail vehicle in the convoy is "first" (step S30, YES), the process proceeds to step S31. On the other hand, the process proceeds to step S33 when the self vehicle is not a tail vehicle (step S30, NO).

In step S31, the process performs a tail distance determination process to determine a distance to the tail vehicle, and proceeds to step S32. In the tail distance determination process in step S31, the distance to the tail vehicle is determined as "0", since the self vehicle is determined as the tail vehicle in step S31.

In step S32, the process broadcasts the tail distance from the tail distance determination process by a broadcast method, and finishes the flow. When the tail distance "0" is determined by the tail distance determination process in step S31, the process transmits the tail distance "0". Further, when a tail distance other than "0" is determined by the tail distance determination process of step S34 which is to be mentioned later, the process transmits such tail distance other than "0". The tail distance is transmitted as a part of the vehicle information that is transmitted by the vehicle information transmission process.

In step S33, which is under a NO branch of step S30, that is, when the self vehicle is not a tail vehicle of the self convoy, the process determines whether the self vehicle has received the tail distance of the closest succeeding vehicle (i.e., a follower vehicle hereinafter). For example, when (i) the device ID of the sender vehicle of the received vehicle information is identical with the device ID of the follower vehicle of the self vehicle which is determined by the above-described vehicle order determination process and (ii) such vehicle information includes the tail distance, it is determined that the tail distance of the follower vehicle has been received. The vehicle information may be retrieved from the memory described above, for use in such process of step S33.

Then, the process proceeds to step S34 when it is determined that the tail distance of the follower vehicle has been received (step S33, YES). On the other hand, the process finishes the flow when it is determined that the tail distance of the following vehicle has not been received (step S33, NO).

In step S34, the process performs the tail distance determination process to determine the tail distance to the tail vehicle, and proceeds to step S32. In the tail distance determination process in step S34, the process determines the tail distance of the self vehicle as a sum of (i) a tail distance of the follower vehicle that follows the self vehicle, (ii) a radar inter-vehicle distance of the self vehicle toward the follower vehicle which is received from the follower vehicle, and (iii) a vehicle length of the self vehicle. For example, when the self vehicle is the second vehicle from the tail vehicle of the convoy, and the radar inter-vehicle distance toward the follower vehicle is designated as "d3", and the vehicle length of the self vehicle is 12, the tail distance of the self vehicle is determined as 0+d3+12. Therefore, the tail distance corresponds to tail vehicle distance in the claims, and step S34 corresponds to a distance calculator in the claims.

For the purpose of clarity, the flow of the leader distance determination-plus process and the flow of the tail distance determination-plus process are described in the above as two separate processes. However, the two process may be combined for simultaneously determining the leader distance and the tail distance of the self vehicle. Further, the determined two distances may be included in the same vehicle information, to be transmitted by the above-described vehicle information transmission process. Therefore, step S4 corresponds to a convoy information transmitter in the claims.

Figure 6:
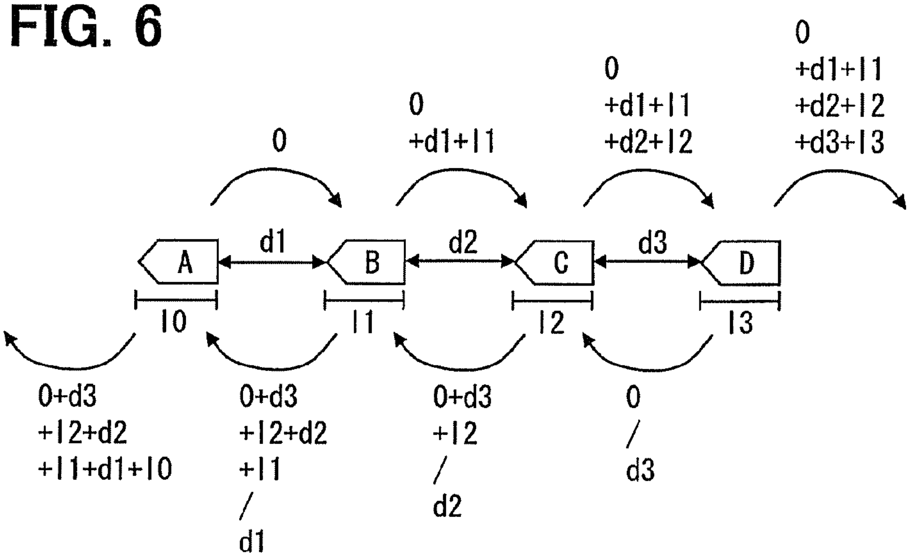
FIG. 6 is an illustration of information transmission regarding a leader distance and a tail distance in a convoy.

With reference to an illustration in FIG. 6, an example of the transmission of the leader distance and the tail distance in the convoy is described. FIG. 6 illustrates a convoy Pa that is formed by four vehicles A to D, arranged in this order of A, B, C and D. Further, the vehicle lengths of respective vehicles A to D in FIG. 6 are defined as l0 (vehicle A), l1 (vehicle B), l2 (vehicle C), and l3 (vehicle D), and the radar inter-vehicle distance between vehicle A and vehicle B is d1, and the radar inter-vehicle distance between vehicle B and vehicle C is d2, and the radar inter-vehicle distance between vehicle C and vehicle D is d3.

As shown in FIG. 6, the convoy travel apparatus 1 of the leader vehicle A transmits a distance of 0 (zero) as the leader distance, and transmits a distance of 0+d3+l2+d2+l1+d1+l0 as the tail distance. The convoy travel apparatus 1 of the vehicle B transmits a distance of 0+d1+l1 as the leader distance, and transmits a distance of 0+d3+l2+d2+l1 as the tail distance, and transmits a distance of d1 as the radar inter-vehicle distance to the preceding vehicle. The convoy travel apparatus 1 of the vehicle C transmits a distance of 0+d1+l1+d2+l2, as the leader distance, and transmits a distance of 0+d3+l2 as the tail distance, and transmits a distance of d2 as the radar inter-vehicle distance to the preceding vehicle. The convoy travel apparatus 1 of the vehicle D, which is the tail vehicle in the convoy, transmits a distance of 0+d1+l1+d2+l2+d3+l3, as the leader distance, and transmits a distance of 0 as the tail distance, and transmits a distance of d3 as the radar inter-vehicle distance to the preceding vehicle.

Though the above description describes a calculation of the self-vehicle's leader/tail distances based on the preceding-vehicle's leader distance and the follower-vehicle's tail distance, the calculation of those distances is not limited to such method. That is, for example, when the position information and the vehicle length of the leader vehicle or the position information and the vehicle length of the tail vehicle are transmitted by the convoy travel apparatus 1 of each of the respective vehicles in the convoy, the leader/tail distances of the self vehicle may be determined based on such information (i.e., the position information and the vehicle length of the leader vehicle or the position information and the vehicle length of the tail vehicle).

More practically, based on the position information of the self vehicle and the position information of the leader vehicle, the above-described inter-position distance between the self vehicle and the leader vehicle is calculated. Then, the inter-position distance is used to calculate the leader distance of the self vehicle according to the following equation:

the leader distance of the self vehicle=an inter-position distance−(vehicle lengths of the self+leader vehicles)/2 (Equation 2)

Further, based on the position information of the self vehicle and the position information of the leader vehicle, the above-described inter-position distance between the self vehicle and the tail vehicle is calculated. Then, the inter-position distance is used to calculate the tail distance of the self vehicle according to the following equation:

the tail distance of the self vehicle=an inter-position distance−(vehicle lengths of the self+tail vehicles)/2 (Equation 3)

Further, the convoy travel apparatus 1 performs an in-parallel travel related process. An example of a flow of the in-parallel travel related process is described with reference to a flowchart in FIG. 7. The in-parallel travel time process is started when, for example, the vehicle information is received through the wireless communication device 2.

First, in step S40, the process determines whether the self vehicle is a leader vehicle of the convoy. When the process in step S40 determines that the self vehicle is a leader vehicle of the convoy (step S40, YES), the process proceeds to step S41. On the other hand, the process ends when it determines that the self vehicle is not a leader vehicle (step S40, NO).

In step S41, the process determines whether the received vehicle information is the vehicle information of the vehicle in an other convoy. In case that the leader distance and the tail distance are included in the received vehicle information, such received vehicle information indicates that the sender vehicle of the received vehicle information is traveling in a convoy. Therefore, whether the received vehicle information is from the vehicle in the other convoy is determined based on whether the received vehicle information, received from the sender vehicle that is not in the self convoy, includes the leader/tail distances. In such case, whether the sender vehicle is not in the self convoy is determined based on whether the vehicle information from such sender vehicle includes a device ID of the vehicle that has already been determined as not being a vehicle in the self convoy.

Then, when it is determined that the received vehicle information is from a vehicle in the other convoy (step S41, YES), the process proceeds to step S42. On the other hand, the process finishes the flow when it is determined that the received vehicle information is from a vehicle in the self convoy (step S41, NO), the process ends.

In step S42, the process determines whether a travel direction of the other convoy is the same as a travel direction of the self convoy. For example, when a difference between a travel direction of the self vehicle from the position detector 4 and a travel direction of the other convoy included in the received vehicle information of the vehicle in the other convoy is under a certain threshold, the two convoys are determined as having the same travel direction. The certain threshold mentioned above may be a value of a detection error of the sensing device, for example.

Then, the process proceeds to step S43 when it is determined that the two convoys have the same travel direction (step S42, YES). On the other hand, the process finishes the flow when it is determined that the two convoys have respectively different travel directions (step S42, NO).

In step S43, the process performs an in-parallel travel determination process, and proceeds to step S44. During the in-parallel travel determination process, the process determines whether the self convoy and the other convoy are traveling in parallel with each other, based on the vehicle information of the self vehicle and the received vehicle information from "the other vehicle" (i.e., a vehicle in other convoy). The vehicle information of the self vehicle is, in this case, the tail distance, the position information, and the travel direction of the self vehicle, and the received vehicle information from the other vehicle is, in this case, the leader distance, the tail distance, the position information, and the travel direction of the other vehicle. The process in step S43 corresponds to a parallel travel determination unit in the claims.

Further, in the in-parallel travel determination process, the position information and the travel direction of the other vehicle, which are included in the received vehicle information, should have substantially the same detection time as the position information and the travel direction of the self vehicle. Correspondence of two detection times between two pieces of the vehicle information from the two vehicles is examined/verified based on the time stamp of each piece of the vehicle information, for example.

Figure 8:
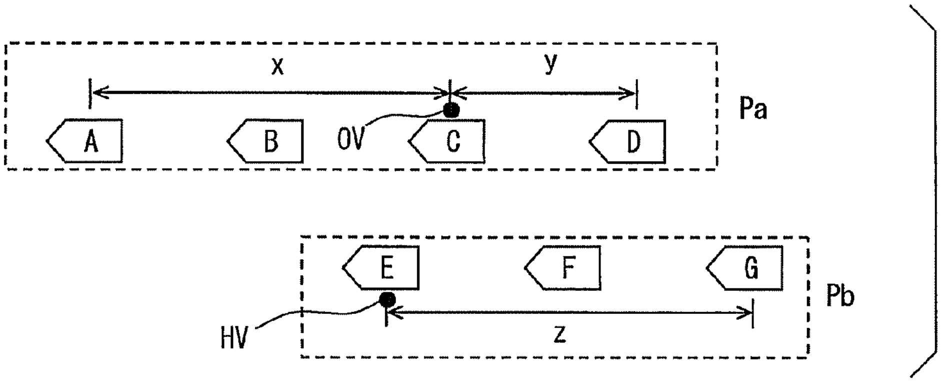
FIG. 8 is an illustration of a situation when an in-parallel travel determination process is performed.

More practically, the in-parallel travel determination process is performed in the following manner as shown in FIG. 8. The convoy Pa in FIG. 8 including the vehicles A to D and a convoy Pb including vehicles E to G are assumed to be traveling. HV in FIG. 8 is a position coordinate of the self vehicle, and OV in FIG. 8 is a position coordinate of the vehicle in the other convoy, and a value x is the leader distance of the other vehicle, and a value y is the tail distance of the other vehicle.

First, the position coordinate HV of the self vehicle and the position coordinate OV of the other vehicle are assumed to be two points HV, OV in the two-dimensional coordinate system. That is, for example, the latitude of the points HV, OV is considered as a y coordinate, and the longitude of the points HV, OV is considered as an x coordinate. Then, a straight line having a tail distance z of the self vehicle (i.e., a segment z) is drawn backward from the point HV (i.e., from the self vehicle position). Further, a straight line having a leader distance x (i.e., a segment x) is drawn along the travel direction of the other vehicle from the point OV (i.e., from the other vehicle position), and a straight line having a tail distance y (i.e., a segment y) is drawn backward from the point OV.

Then, a line that is perpendicular to the segment z is drawn from each of the two end points of the segment z (i.e., from the point HV and from a point on the other end of the segment z) and based on whether at least one of the two perpendicular lines intersect the segment x+the segment y, it is determined that the two convoys Pa, Pb are in an in-parallel travel state. If none of the two perpendicular lines intersects the segment x or the segment y, it is determined that the convoys Pa, Pb (i.e., the self convoy and the other convoy) are not in the in-parallel travel state.

Although the in-parallel travel state of the self/other convoys is determined based on whether the perpendicular lines from the two end points from the segment z intersect the segments x+y in the above, the determination of such condition may be performed differently. That is, for example, the two perpendicular lines may be drawn from two end points of the segments x+y, and the in-parallel travel state may be determined based on whether such perpendicular lines intersect the segment z.

Further, in view of the same travel directions of the two (i.e., self/other) vehicles which has already been determined, the segment z and the segments x+y may be drawn along one of two travel directions (i.e., along the travel direction of the self vehicle or along the travel direction of the other vehicle).

Figure 7:
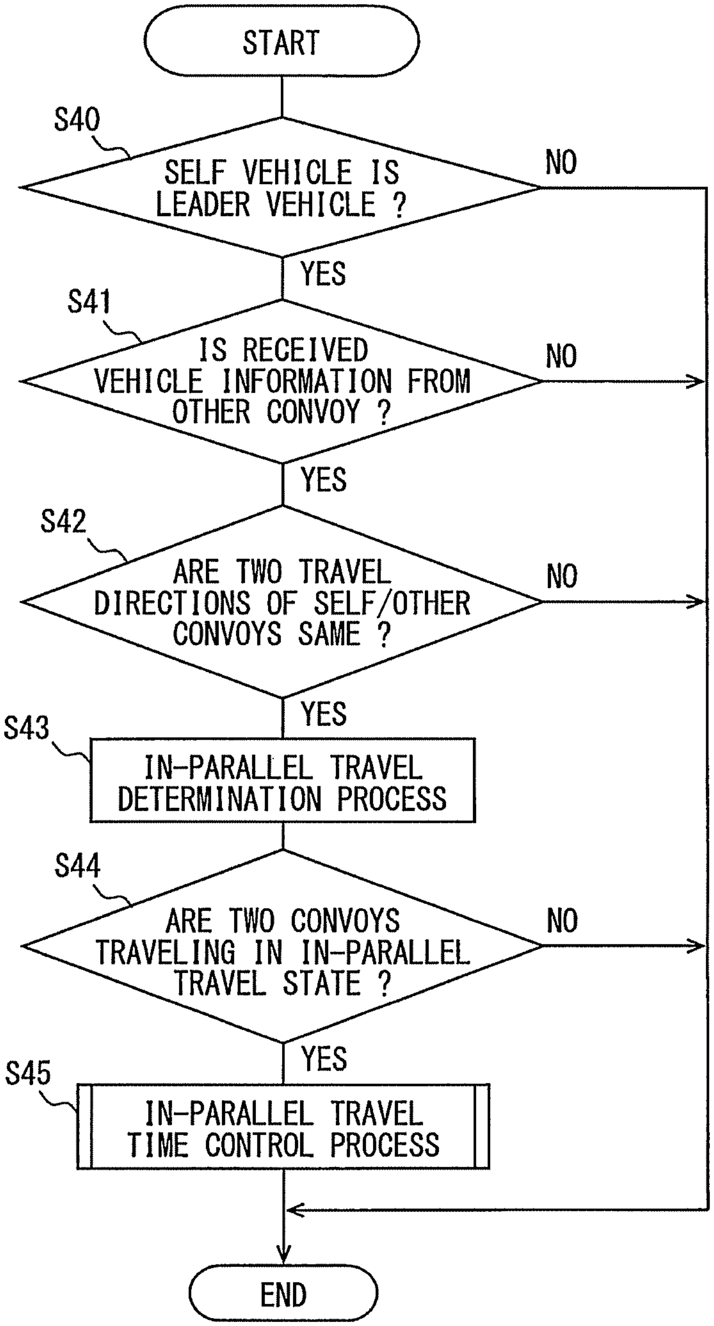
FIG. 7 is a flowchart of an in-parallel travel related process by the convoy travel apparatus in the first embodiment.

The description returns to FIG. 7, and, the process in step S44 determines whether the two convoys are in the in-parallel travel state. When the process in step S44 determines that the two convoys are in the in-parallel travel state (step S44, YES), the process proceeds to step S45. On the other hand, the process finishes the flow when it is determined that the two convoys are not in the in-parallel travel state (step S44, NO).

In step S45, the process performs an in-parallel travel time control process. In the in-parallel travel time control process, the vehicle behavior of the self vehicle is controlled for resolving the in-parallel travel state of the two convoys. Therefore, the process in step S45 corresponds to a parallel travel resolver in the claims. An example of the in-parallel travel time control process is described in the following with reference to a flowchart in FIG. 9.

The in-parallel travel time control process in step S450 performs a resolve distance calculation process, which calculates a resolve distance for resolving an in-parallel state of the two convoys, and proceeds to step S451. Two distances are calculated during the resolve distance calculation process. That is, a forward adjustment distance is calculated as a relative distance (i.e., between two convoys) for an adjustment in which the self convoy goes ahead of the other convoy, and a backward adjustment distance is calculated as a relative distance (i.e., between two convoys) for an adjustment in which the other convoy goes ahead of the self convoy.

Figure 10A:
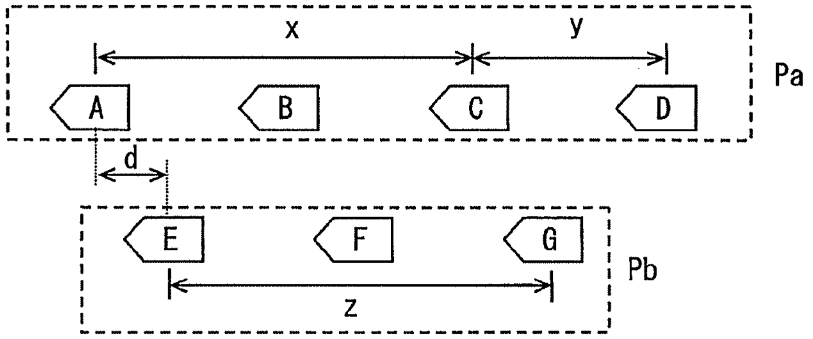
FIGS. 10A and 10B are illustrations of a forward adjustment distance and a backward adjustment distance.

For example, as shown in FIG. 10A, when the convoy Pb is preceded by the convoy Pa in the travel direction, that is, when the self convoy (Pb) is preceded by the other convoy (Pa), a distance d by which the other convoy (Pa) precedes the self convoy (Pb) is subtracted from a convoy length of the other convoy (Pa) for calculating the forward adjustment distance. That is, by subtracting the distance d from the convoy length x+y of the other convoy, the forward adjustment distance (x+y−d) is calculated. Further, the distance d is added to a convoy length of the self convoy (Pb) for calculating the backward adjustment distance. That is, by adding the distance d to the convoy length z of the self convoy (Pb), the backward adjustment distance (z+d) is calculated.

Figure 10B:
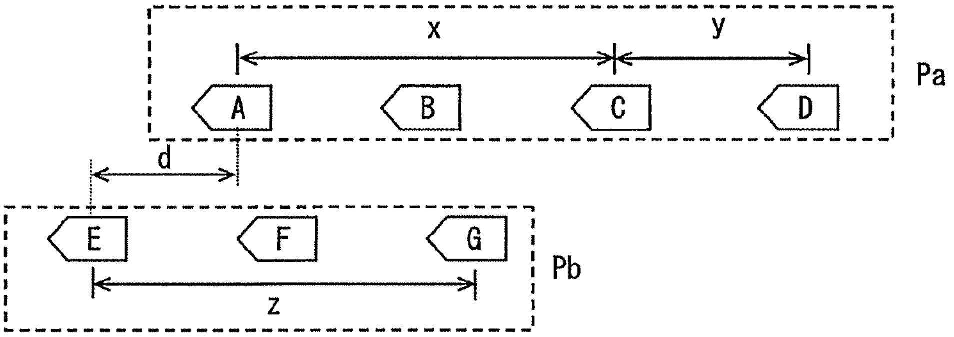

On the other hand, as shown in FIG. 10B, when the convoy Pa is preceded by the convoy Pb in the travel direction, that is, when the other convoy (Pa) is preceded by the self convoy (Pb), the distance d by which the self convoy (Pb) precedes the other convoy (Pa) is subtracted from the convoy length of the self convoy (Pb) for calculating the forward adjustment distance. That is, by subtracting the distance d from the convoy length z of the self convoy (Pb), the forward adjustment distance (z−d) is calculated. Further, the distance d is added to the convoy length of the other convoy (Pa) for calculating the backward adjustment distance. That is, by adding the distance d to the convoy length x+y of the other convoy (Pa), the backward adjustment distance (x+y+d) is calculated.

In step S451, from among the two distances calculated in the resolve distance calculation process (i.e., from among the forward/backward adjustment distances), the process determines whether the forward adjustment distance is less than the backward adjustment distance. Therefore, the process in step S451 corresponds to a distance determiner in the claims. Then, the process proceeds to step S452 when the front adjustment distance is less than the backward adjustment distance (step S451. YES). On the other hand, the process proceeds to step S453 when the front adjustment distance is greater than the backward adjustment distance (step S451, NO).

In step S452, the process performs an acceleration process while maintaining the self vehicle in the currently traveling lane, and proceeds to step S454. During the acceleration process, the self vehicle is accelerated to a vehicle speed that is greater than a vehicle speed of the other vehicle that is included in the vehicle information of the other vehicle, by, for example, sending an instruction to the ENG_ECU 8. More practically, the self vehicle may be accelerated to a vehicle speed that is a sum of the speed of the other vehicle and a predetermined value, for example, 10 km/h.

In step S453, the process performs a deceleration process while maintaining the self vehicle within the currently-traveling lane, and proceeds to step S454. During the deceleration process, the self vehicle is decelerated to have a vehicle speed that is less than a vehicle speed of the other vehicle that is included in the vehicle information of the other vehicle, by, for example, sending an instruction to the VSC_ECU 7. More practically, the self vehicle may be decelerated to have a vehicle speed that is lower than the speed of the other vehicle by a predetermined value, for example, 10 km/h.

Further, the acceleration process and the deceleration process may not only be performed to increase/decrease the vehicle speed of the self vehicle with reference to the speed of the other vehicle, but may also be performed to increase/decrease the vehicle speed of the self vehicle to a predetermined fixed speed, for example. That is, the acceleration process may accelerate the self vehicle to a first predetermined speed, and the deceleration process may decelerate the self vehicle to a second predetermined speed (i.e., Modification 1). The acceleration and the deceleration may preferably be performed with reference to the vehicle speed of the other vehicle, because, in such manner, the vehicle speed of the self vehicle is more securely accelerated/decelerated relative to the other vehicle, which results in a greater forward/backward adjustment distance.

In step S454, the process determines whether a speed control end timing has arrived for the acceleration/deceleration process. The process ends when it is determined that the end timing has arrived (step S454, YES). On the other hand, the process repeats step S454 when it is determined that the end timing has not yet arrived (step S454, NO).

For example, the end timing of the acceleration/deceleration process may be determined in the following manner. That is, the acceleration process may end at a timing when a difference between (i) a travel distance of the self vehicle after a start of the acceleration process and (ii) an estimated travel distance of the other vehicle after a start of the acceleration process which is estimated from the vehicle information of the other vehicle including the position information and the vehicle speed reaches a certain value that may be calculated as a sum of the forward adjustment distance and a predetermined value, which is calculated in the resolve distance calculation process as stated above.

Further, the deceleration process may end at a timing when a difference between (i) an estimated travel distance of the other vehicle after a start of the deceleration process which is estimated from the vehicle information of the other vehicle including the position information and the vehicle speed and (ii) a travel distance of the self vehicle after a start of the deceleration process reaches a certain value that may be calculated as a sum of the backward adjustment distance and a predetermined value, which is calculated in the resolve distance calculation process as stated above. In this case, the predetermined value may substantially be an inter-vehicle distance value that is required for allowing a vehicle to cut in between two other vehicles.

During the acceleration/deceleration control of the self vehicle, which is a leader vehicle of the self convoy, such control results in the control of the other vehicles in the self convoy by the convoy travel apparatus 1 in those vehicles, which controls the other vehicles to follow the leader vehicle. Therefore, when it is determined that the two (i.e., the self/other) convoys are in the in-parallel travel state, the acceleration/deceleration control of the self vehicle that is serving as a leader vehicle of the self convoy resolves such in-parallel travel state of the two convoys.

Therefore, according to the configuration of the first embodiment, when the self convoy and the other convoy are determined to be in the in-parallel travel state which hinders the overtaking of the overtaking non-in-convoy vehicle from passing those convoys, the convoy travel apparatus 1 can allow such vehicle to pass the two convoys by resolving the in-parallel travel state of the two convoys.

Further, according to the configuration of the first embodiment, when the forward adjustment distance is less than the backward adjustment distance, the acceleration process is performed for controlling the self convoy to precede the other convoy, and, when the front adjustment distance is greater than the backward adjustment distance, the deceleration process is performed for controlling the other convoy to precede the self convoy. That is, in other words, the adjustment distance for resolving the in-parallel travel state is reduced.

Figure 9:
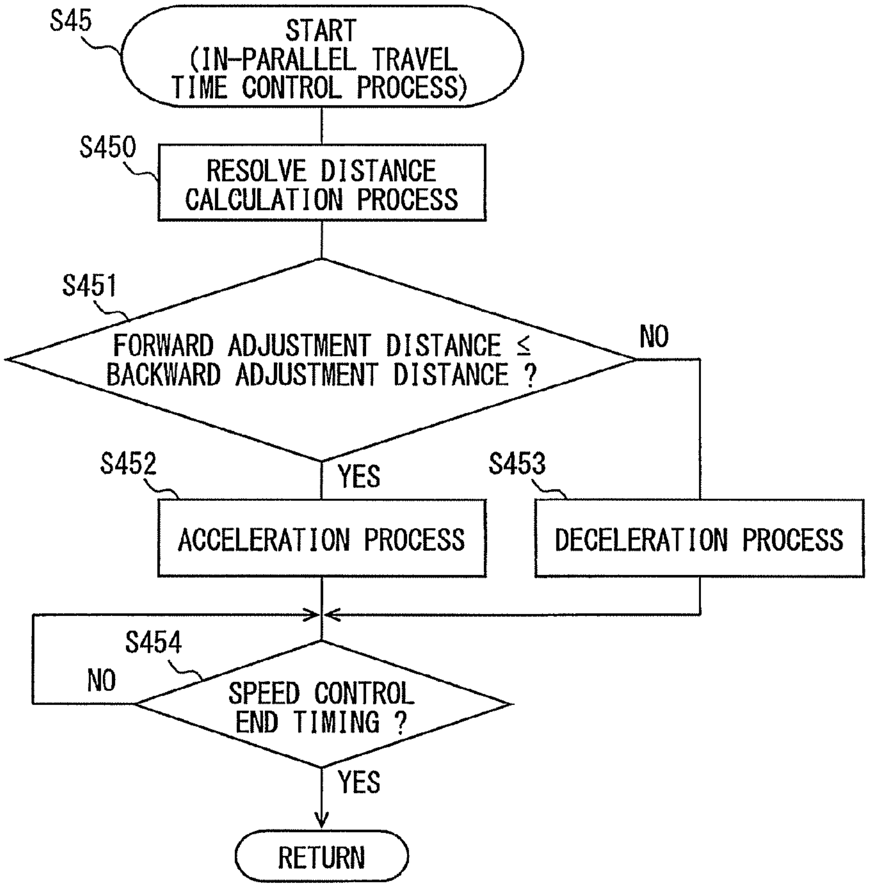
FIG. 9 is a flowchart of the in-parallel travel determination process by the convoy travel apparatus.

Furthermore, as clearly shown in the flowchart in FIG. 9 and the illustrations in FIGS. 10A and 10B, when the convoy travel apparatus 1 in each leader vehicle in the two convoys traveling in parallel determines the in-parallel travel state of the two convoys, one apparatus 1 determines, based on its independent determination, to decelerate in order to allow the other convoy to go ahead of the self convoy, and the other apparatus 1 determines, based also on its independent determination, to accelerate for allowing the self vehicle to go ahead of the other convoy. That is, there is no need for the two apparatuses 1 in respective leader vehicles to negotiate, for resolving the in-parallel travel state. In other words, the independent determination of respective apparatuses 1 in those leader vehicles can resolve the in-parallel travel state of the two convoys.

Further, at a time of the acceleration process, the acceleration of the vehicle may be performed in a manner that observes the speed limit value of the road on the relevant links that are represented by the link data. Further, if the speed of the other vehicle in the vehicle information is substantially equal to the speed limit value of the road, the acceleration process may be cancelled and be switched to the deceleration process for allowing the other convoy to precede the self convoy even when the forward adjustment distance is less than the backward adjustment distance. In such manner, the in-parallel travel state of the two convoys is resolved without failing to observe the speed limit value of the road.

Further, in the in-parallel travel determination process, the in-parallel travel determination of the two convoys may be limited to a more specific determination of the in-parallel travel state of the two convoys in two adjacent lanes (i.e., Modification 2). In such case, whether the two convoys are traveling in the two adjacent lanes is determined based on the information on the travel lane of the self vehicle and the information on the travel lane of the other vehicle in the vehicle information of the other vehicle. Therefore, the convoy travel apparatus 1 corresponds to a lane identification information obtainer in the claims.

Further, the in-parallel travel state of the two convoys in two adjacent lanes may be determined based on the information of the number of lanes in the link data. That is, when (i) the number of lanes of the relevant road is equal to two and (ii) the self vehicle's traveling lane and the other vehicle's traveling lane are different, it may be determined that the two convoys are traveling in the in-parallel travel state in the two adjacent lanes.

Further, the in-parallel travel state of the two convoys in two adjacent lanes may be determined based on (i) the relative position between the self vehicle and the other vehicle which is derived from the position information of the self/other vehicles and (ii) the travel directions of the self/other vehicles (i.e., Modification 3). For example, when (i) the difference of the two travel directions is within a threshold (i.e., the two travel directions are substantially same) and (ii) the relative position of the other vehicle relative to the self vehicle is within a range that is estimated not to go beyond the adjacent lane, the two convoys may be determined in the in-parallel travel state in the two adjacent lanes.

In such manner, when the two convoys are traveling in two side lanes that border the center lane on a three-lane road, which does not hinder the passing of the non-convoy vehicle in the center lane (i.e., when the non-convoy vehicle overtaking from behind the two convoys is not required to change lanes more than once), it is not required for the two convoys to perform the in-parallel travel time control process needlessly. Therefore, such a configuration that is capable of performing the more specific determination described above (i.e., in-parallel travel state determination in a two adjacent lane) reduces an unnecessary acceleration/deceleration process, when compared to the configuration that is not capable of performing the more specific determination.

Second Embodiment

The present disclosure is not limited to the above-described first embodiment, but includes the second embodiment described below. The second embodiment is now described with reference to FIG. 11. For the sake of brevity, like parts have like numbers in the first and second embodiments.

The convoy travel apparatus 1 of the second embodiment is similar to the convoy travel apparatus of the first embodiment, except that the in-parallel travel time control process is performed differently. More specifically, when the self convoy and the other convoy are determined to be in the in-parallel travel state by the convoy travel apparatus 1 of the first embodiment, the convoy travel apparatus 1 of the second embodiment resolves the in-parallel travel state of the two convoys by performing the acceleration/deceleration process without changing the traveling lane (i.e., by maintaining the convoys their respective lanes). In the same situation, the convoy travel apparatus 1 of the second embodiment performs a steering control to change lane (i.e., to transit to a vacant space in the adjacent lane of the currently traveling lane) for resolving the in-parallel travel state of the two convoys.

The convoy travel apparatus 1 of the second embodiment performs a follow travel control that automatically controls steering angle of the self vehicle based on (i) the travel locus of the preceding vehicle according to the vehicle positions of the preceding vehicle and (ii) the steering angle of the preceding vehicle respectively derived through vehicle-to-vehicle communication, while performing a follow travel control of having a target inter-vehicle distance toward the preceding vehicle. The steering angle may include the operation angle of the steering wheel or the steer angle of the tires.

Further, the convoy travel apparatus 1 of the second embodiment performs the in-parallel travel determination process as a more specific determination, as already described in the above as Modifications 2 and 3, which limits the determination of the in-parallel travel only to the in-parallel travel of the two convoys in two adjacent lanes.

Figure 11:
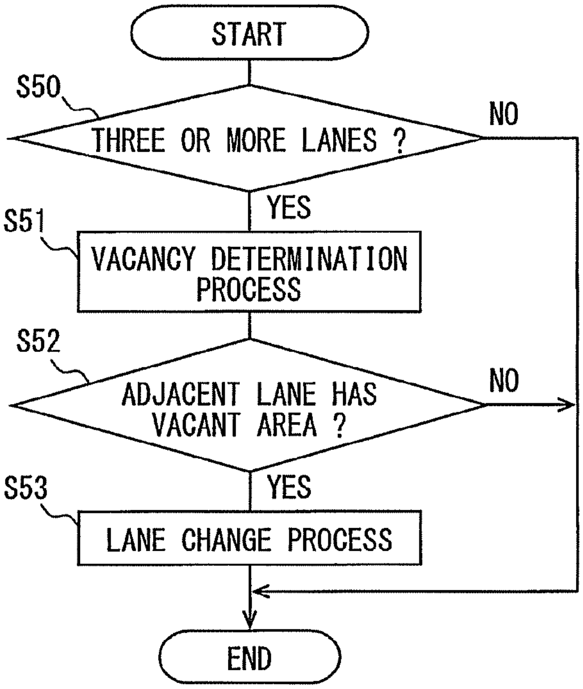
FIG. 11 is a flowchart of the in-parallel travel determination process by the convoy travel apparatus in a second embodiment of the present disclosure.

The flowchart in FIG. 11 describes an example of the in-parallel travel time control process by the convoy travel apparatus 1 in the second embodiment.

First, in step S50, the process determines whether the currently-traveling road has three or more lanes on one side of the road (i.e., the respective traffic direction). When it is determined that the road has three or more lanes (step S50, YES), the process proceeds to step S51. On the other hand, when the road has less than three lanes (step S50, NO), the process ends. The number of lanes of the road where the self vehicle is traveling may be determined based on the data regarding the number of lanes in the link data.

In step S51, the process performs a vacancy determination process, and proceeds to step S51. The vacancy determination process determines whether the adjacent lane of the currently-traveling lane has a vacant area where the entire self convoy fits into, at a position that extends from a diagonal front direction of the self convoy toward an exact side (i.e., on a right side or on a left side) of the self convoy. Therefore, this vacancy determination process of step S50 corresponds to a vacancy determination unit in the claims.

For example, the vacancy determination process may determine such vacancy determination by the radar 3 in each of all in-convoy vehicles in the self convoy. That is, based on a radar detection result of the radar 3 in each vehicle, the vacancy of a diagonal right-front area of the vehicle and the vacancy of a diagonally left-front area of the vehicle may be determined. More practically, when none of the radars 3 in all in-convoy vehicles detect a vehicle in the diagonally left-front area of those vehicles, the process determines that the adjacent lane of the self vehicle's currently-traveling lane has a vacant area where the entire self convoy fits into, at a position that extends from the diagonal-left front of the self convoy toward a left side of the self convoy. Or, when none of the radars 3 in all in-convoy vehicles detect a vehicle in the diagonally right-front area of those vehicles, the process determines that the adjacent lane of the self vehicle's currently-traveling lane has a vacant area where the entire self convoy fits into, at a position that extends from the diagonal-right front of the of the self convoy toward a right side of the self convoy. Further, when a radar 3 in at least one of all in-convoy vehicles detects a vehicle in the above diagonally right/left-front area, the process determines that there is no vacancy on a vehicle-detected side of the self convoy.

When the above configuration is realized, the vehicle detection results on the diagonally-right/left side by using the radar 3 on each of all vehicles may be transmitted as a part of the vehicle information for a transmission between vehicles. Further, when the convoy travel apparatus 1 of an in-convoy vehicle receives the above-described detection results from the other in-convoy vehicle, the received detection results may be re-transmitted as the vehicle information to a yet another vehicle after incorporating, in the vehicle information, the received detection result as well as the detection result of the self vehicle. In such manner, the leader vehicle of the self convoy can receive the detection results from all in-convoy vehicles.

Further, when the convoy travel apparatus 1 is capable of obtaining, by using the wireless communication device 2 which communicates with the roadside device such as a beacon or the like, information about the presence/non-presence of vehicles in a predetermined section of each lane of the road, the above determination may be performed based on such information. The above determination may further be performed based on other information sources.

In step S52, when the process determines that the adjacent lane has a vacancy (step S52, YES), the process proceeds to step S53. On the other hand, the process ends when the process determines that there is no vacancy (step S52, NO).

In step S53, the process performs a lane change process and the process ends. The lane change process sends an instruction to EPS_ECU (not illustrated), for example, to perform a steering control, for the lane change of the self vehicle to a side that is determined to have a vacancy.

More practically, the self vehicle may change lanes under a steering control in a feedback manner, in which a lateral movement of the self vehicle is controlled to have a target amount based on, for example, a camera-captured image supplied for the convoy travel apparatus 1 which enables a detection of the lateral movement of the self vehicle relative to a position of the adjacent lane.

When the steering control is performed in the self vehicle that serves as a leader vehicle of the self convoy, the rest of the in-convoy vehicles should follow the leader vehicle by performing the same steering control in the convoy travel apparatuses 1 in respective vehicles, thereby resulting in a lane change of the entire self convoy.

Therefore, according to the configuration of the second embodiment, when (i) the two convoys are in the in-parallel travel state, and (ii) the passing of the overtaking non-convoy vehicle is being hindered by such in-parallel travel state, the passing of the overtaking non-convoy vehicle is enabled/allowed by the lane change of the self convoy that resolves such an in-parallel travel state of the two convoys.

Further, when it is determined in step S50 that the currently-traveling lane of the self vehicle has less than three lanes, or when it is determined in step S52 that no vacancy is found in the adjacent lane, the convoy travel apparatus 1 may resolve the in-parallel state of the two convoys by performing the acceleration/deceleration process without changing lanes, as described in the first embodiment.

According to such configuration, when no other lane or no vacancy is available for a lane change, the in-parallel travel state of the two (self/other) convoys are resolved. Further, when a vacancy for a lane change is available, the in-parallel travel state is resolved by the lane change, which makes it possible to resolve the in-parallel travel state by performing a acceleration/deceleration process of a lesser degree, relative to the control that accelerates/decelerates the self convoy to pass or be passed by the other convoy.

Further, even though the present disclosure has been fully described in connection with the above embodiment with reference to the accompanying drawings, it is to be noted that various changes and modifications will become apparent to those skilled in the art including a combination of two or more embodiments, and such changes and modifications are to be understood as being within the scope of the present disclosure as defined by the appended claims.

What is claimed is:

1. A convoy travel apparatus for a self vehicle executed on a processor, the apparatus comprising:

a follow travel control unit configured to guide the self vehicle to follow a preceding vehicle based on information transmitted from the preceding vehicle, the preceding vehicle and at least one follower vehicle making up a convoy of traveling vehicles;

an in-convoy vehicle identification unit configured to identify each of all vehicles except the self vehicle in a self convoy as an in-convoy vehicle;

an order identification unit configured to determine an order of the self vehicle in the self convoy based on the information obtained from other vehicles;

a distance calculator configured to calculate a leader vehicle distance, based on the information from the other vehicles, between the self vehicle and a leader vehicle of the self convoy and a tail vehicle distance between the self vehicle and a tail vehicle traveling at a tail end of the self convoy;

a convoy information transmitter configured to transmit, to the other vehicles, convoy information including the leader vehicle distance, the tail vehicle distance, a current position of the self vehicle, and a travel direction of the self vehicle;

a parallel travel determination unit configured to determine, when the self vehicle is the leader vehicle of the self convoy, whether the self convoy and an object convoy are traveling in parallel with each other in an in-parallel travel state, based on the convoy information of the self convoy that at least includes the tail vehicle distance between the self vehicle in the self convoy and the tail vehicle traveling at the tail end of the self convoy, the current position of the self vehicle, and the travel direction of the self vehicle and the convoy information of the object convoy transmitted from an external vehicle that does not belong to the self convoy and belongs to the object convoy, the convoy information of the object convoy including a current position, a travel direction, a leader vehicle distance between the external vehicle and a leader vehicle of the object convoy and a tail vehicle distance of the external vehicle between the external vehicle and a tail vehicle traveling at a tail end of the object convoy; and a parallel travel resolver configured to resolve the in-parallel travel state of the self convoy and the object convoy by controlling a behavior of the self vehicle when the parallel travel determination unit determines that the two convoys are in the in-parallel travel state.

2. The convoy travel apparatus of claim 1, wherein the parallel travel resolver is configured to perform a speed control for increasing a speed of the self convoy or for decreasing the speed of the self convoy, while maintaining within a currently-traveling lane.

3. The convoy travel apparatus of claim 2 further comprising:

a distance determiner configured to determine which of a forward adjustment and a backward adjustment is a lesser adjustment distance for the self convoy to resolve the in-parallel travel state, where (i) the forward adjustment moves the self convoy forward to a position ahead of the object convoy and (ii) the backward adjustment moves the self convoy backward to allow the object convoy to move to a position ahead of the self convoy, wherein the parallel travel resolver is configured to accelerate the self vehicle when the distance determiner determines that the forward adjustment distance is less than the backward adjustment distance, and the parallel travel resolver is configured to decelerate the self vehicle when the distance determiner determines that the backward adjustment distance is less than the forward adjustment distance.

4. The convoy travel apparatus of claim 2, wherein the convoy information transmitter is configured to transmit a speed of the self vehicle as the convoy information, when accelerating the self vehicle, the parallel travel resolver is configured to accelerate the self vehicle to a speed that exceeds the speed of the external vehicle which is included in the received vehicle information from the external vehicle, and when decelerating the self vehicle, the parallel travel resolver is configured to decelerate the self vehicle to a speed that is lower than the speed of the external vehicle which is included in the received vehicle information from the external vehicle.

5. The convoy travel apparatus of claim 1, wherein the parallel travel determination unit is configured to determine whether the self convoy and the object convoy are traveling in the in-parallel travel state in two adjacent lanes, and when the parallel travel determination unit determines that the self convoy and the object convoy are traveling in the in-parallel travel state in two adjacent lanes, the parallel travel resolver is configured to control a behavior of the self vehicle for resolving the in-parallel travel state.

6. The convoy travel apparatus of claim 1, wherein the parallel travel determination unit is configured to determine whether the self convoy and the object convoy are traveling in the in-parallel travel state in two adjacent lanes, and the follow travel control unit is configured to control the self vehicle to follow the preceding vehicle and to change lanes by using information obtained from the preceding vehicle when the preceding vehicle changes lanes, the convoy travel apparatus further comprising:

a vacancy determination unit configured to determine whether an adjacent lane has a vacant area, at a position that extends from a diagonal front of the self convoy toward a side of the self convoy, into which all vehicles in the self convoy are movable by changing lanes, and the parallel travel resolver is configured to perform a steering control for the self vehicle to change lanes when (i) the parallel travel determination unit determines whether the self convoy and the object convoy are traveling in the in-parallel travel state in two adjacent lanes and (ii) the vacancy determination unit determines that the adjacent lane has the vacant area.

7. The convoy travel apparatus of claim 5, wherein the parallel travel determination unit is configured to determine whether the object convoy is traveling in the in-parallel travel state in the adjacent lane that is adjacent to a currently traveling lane of the self vehicle, based on (i) a relative position between the self vehicle and the external vehicle which is derived from the position of the external vehicle and the position of the self vehicle and (ii) the travel directions of the self vehicle and the external vehicle.

8. The convoy travel apparatus of claim 5 further comprising:

a lane identification information obtainer configured to obtain lane identification information that identifies a currently-traveling lane of the self vehicle, wherein the convoy information transmission unit transmits, as the convoy information, the lane identification information, and the parallel travel determination unit is configured to determine whether the object convoy is traveling in the in-parallel travel state in the adjacent lane that is adjacent to a currently traveling lane of the self vehicle, based on (i) the lane identification information that is included in the convoy information received from the external vehicle and (ii) the lane identification information obtained by the lane information obtainer in the self vehicle.

9. The convoy travel apparatus of claim 1, wherein the self convoy and the object convoy are in the in-parallel travel state when the self convoy and the object convoy overlap in a direction perpendicular to the travel direction.

10. The convoy travel apparatus of claim 2, wherein the parallel travel resolver is configured to perform the speed control independently without negotiating with the object convoy on resolving the in-parallel travel state.

* * * * *